(12) United States Patent
Li et al.

(10) Patent No.: US 10,890,713 B2
(45) Date of Patent: Jan. 12, 2021

(54) LIGHT EMITTING GROUP

(71) Applicant: DAYU OPTOELECTRONICS CO., LTD., Taoyuan (TW)

(72) Inventors: Yao-Cheng Li, Taoyuan (TW); Yu-Chieh Chen, Taoyuan (TW)

(73) Assignee: Lumieye Technology Co., Ltd., Taoyuan (TW)

( * ) Notice: Subject to any disclaimer, the term of this patent is extended or adjusted under 35 U.S.C. 154(b) by 0 days.

(21) Appl. No.: 16/521,595

(22) Filed: Jul. 25, 2019

(65) Prior Publication Data

US 2020/0386940 A1  Dec. 10, 2020

(30) Foreign Application Priority Data

Jun. 5, 2019  (TW) .............................. 108119542 A

(51) Int. Cl.
| | | |
|---|---|---|
| *G02B 6/12* | (2006.01) | |
| *G02B 6/42* | (2006.01) | |
| *G06F 1/18* | (2006.01) | |
| *F21V 8/00* | (2006.01) | |
| *F21Y 115/10* | (2016.01) | |
| *H04B 10/80* | (2013.01) | |

(52) U.S. Cl.
CPC ....... *G02B 6/12004* (2013.01); *G02B 6/0068* (2013.01); *G02B 6/0083* (2013.01); *G02B 6/428* (2013.01); *G02B 6/4214* (2013.01); *G06F 1/183* (2013.01); *H04B 10/808* (2013.01); *F21Y 2115/10* (2016.08); *G02B 6/4283* (2013.01)

(58) Field of Classification Search
CPC .............. G02B 6/12004; G02B 6/0083; G02B 6/0068; G02B 6/4214; G02B 6/428; G02B 6/4283; G06F 1/183; F21Y 2115/10; H04B 10/808
See application file for complete search history.

(56) References Cited

U.S. PATENT DOCUMENTS

| | | | |
|---|---|---|---|
| 10,069,252 B1 * | 9/2018 | Lin ..................... | H05B 45/395 |
| 2018/0238502 A1 * | 8/2018 | Chin .................... | G02B 6/4281 |
| 2018/0348459 A1 * | 12/2018 | Marrapode ............ | H01B 11/00 |
| 2020/0096164 A1 * | 3/2020 | Lin ....................... | G02B 6/001 |
| 2020/0096690 A1 * | 3/2020 | Lin ....................... | G02B 6/0096 |

FOREIGN PATENT DOCUMENTS

| | | |
|---|---|---|
| TW | 440734 | 6/2001 |
| TW | 201716815 A | 5/2017 |
| TW | 201734529 A | 10/2017 |
| TW | M572585 U | 1/2019 |

* cited by examiner

*Primary Examiner* — Leslie C Pascal
(74) *Attorney, Agent, or Firm* — Winston Hsu

(57) ABSTRACT

A light emitting group is provided. The light emitting group includes at least two optical cables are adjacent to each other, wherein each optical cable respectively comprises a conductive material and a light guide material, wherein the light guide material covers the conductive material, and a plurality of encapsulated light emitting elements, wherein each optical cable corresponds to at least one encapsulated light emitting element, and the encapsulated light emitting elements are positioned at a terminal of each optical cable, wherein a minimum side of the encapsulated light emitting element is longer than a thickness of the light guide material, and a connecting line is connected with two centers of the two optical cables from a cross-sectional direction, and at least one encapsulated light emitting element overlaps with a perpendicular bisector in the connecting line.

18 Claims, 8 Drawing Sheets

LIGHT EMITTING GROUP

BACKGROUND OF THE INVENTION

1. Field of the Invention

The invention relates to a cable, in particular to a light emitting group.

2. Description of the Prior Art

In recent years, the e-sport industry has developed rapidly, which has also driven the development of software and hardware equipment used by the e-sport industry. As for hardware equipment, in addition to the pursuit of faster computing speed, the modeling of hardware equipment is also constantly innovating, hoping to create products that can attract consumers' attention.

In order to successfully attract the attention of consumers, many products related to electronic competition are combined with light emitting elements to produce devices with luminous effects, such as mice, keyboards, chassis, mainboards, etc. commonly used in electronic competition activities.

The arrangement of electronic components and light-emitting components in the electronic competition equipment will affect the size of the finally assembled equipment when combining the electronic competition equipment and the light-emitting components. On the premise of not increasing the volume of the device and not reducing the size of the components contained in the device, a better arrangement of the internal components is helpful to accommodate more components in a fixed volume, for example, more light emitting components, so that the light emitting mode of the electronic competition device is more variable.

SUMMARY OF THE INVENTION

The present invention provides a light emitting group. The light emitting group includes at least two optical cables are adjacent to each other, wherein each optical cable respectively comprises a conductive material and a light guide material, wherein the light guide material covers the conductive material, and a plurality of encapsulated light emitting elements, wherein each optical cable corresponds to at least one encapsulated light emitting element, and the encapsulated light emitting elements are positioned at a terminal of each optical cable, wherein a minimum side of the encapsulated light emitting element is longer than a thickness of the light guide material, and a connecting line is connected with two centers of the two optical cables from a cross-sectional direction, and at least one encapsulated light emitting element overlaps with a perpendicular bisector in the connecting line.

The invention is characterized in that when more encapsulated light emitting elements are arranged around each optical cable, a stronger light source can be irradiated into the light guide material of the optical cable, so that the display light efficiency intensity of the optical cable is increased, and the light conduction distance can also be increased. However, when the number of encapsulated light emitting elements arranged around the optical cables increases, more space is also needed to accommodate the optical cables and the encapsulated light emitting elements. Therefore, in the present invention, the arrangement mode of the encapsulated light emitting elements is changed, the size of each element does not need to be reduced, and the thickness of the light guide material does not need to be increased either, so that the optical cables can be arranged more tightly, thereby saving space.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, preferred embodiments are detailed as follows. The preferred embodiments of the present invention are illustrated in the accompanying drawings with numbered elements to clarify the contents and the effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Figure 1:
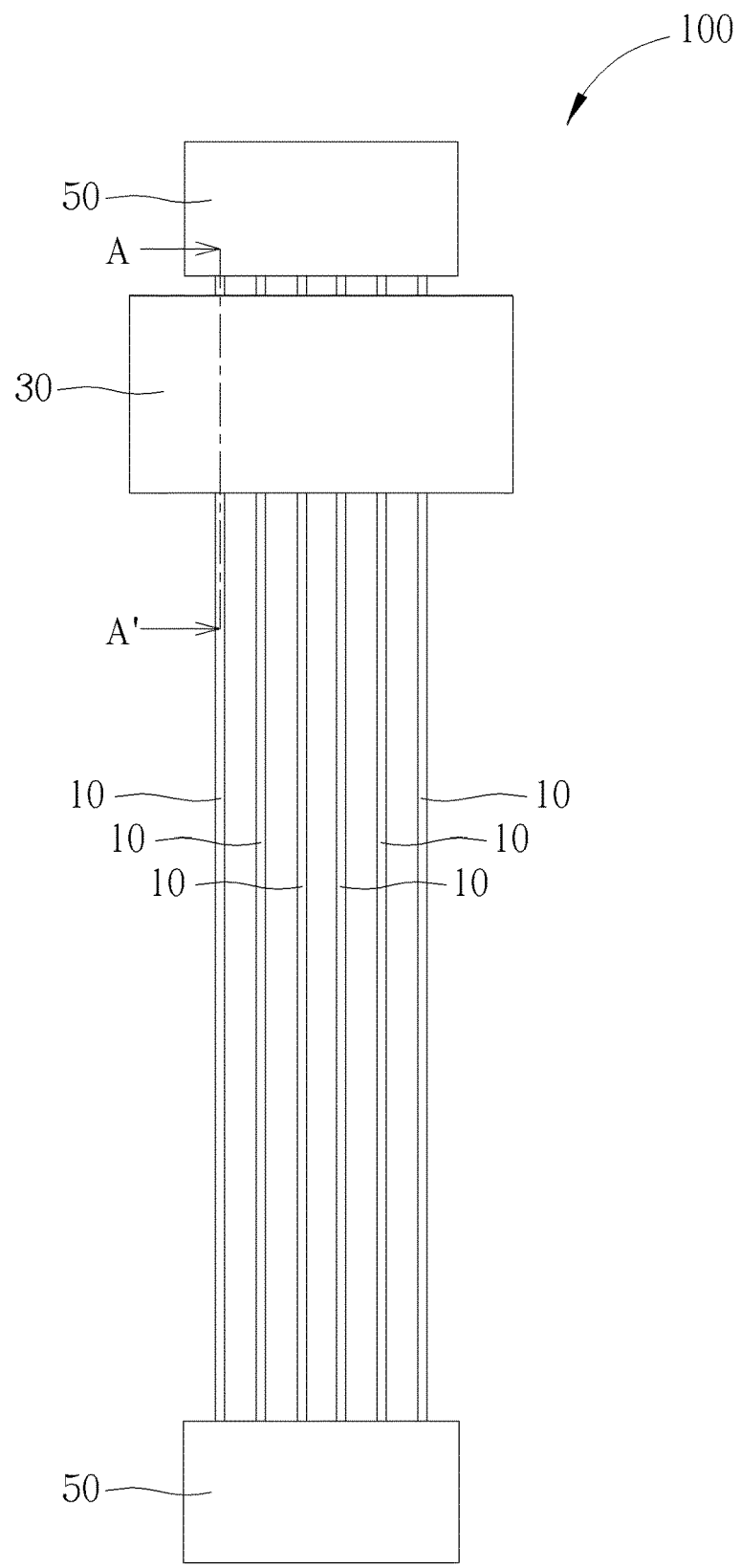
FIG. 1 shows an upper view of a light emitting group according to a preferred embodiment of the present invention.
Figure 2:
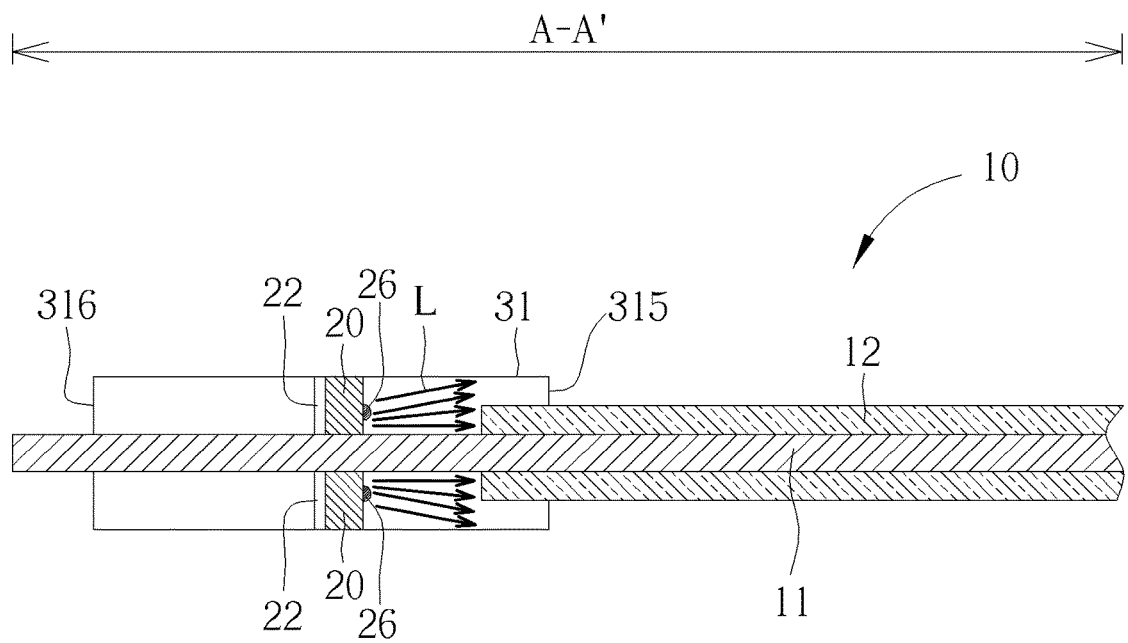
FIG. 2 is a sectional view taken along section line A-A' of FIG. 1.
Figure 3:
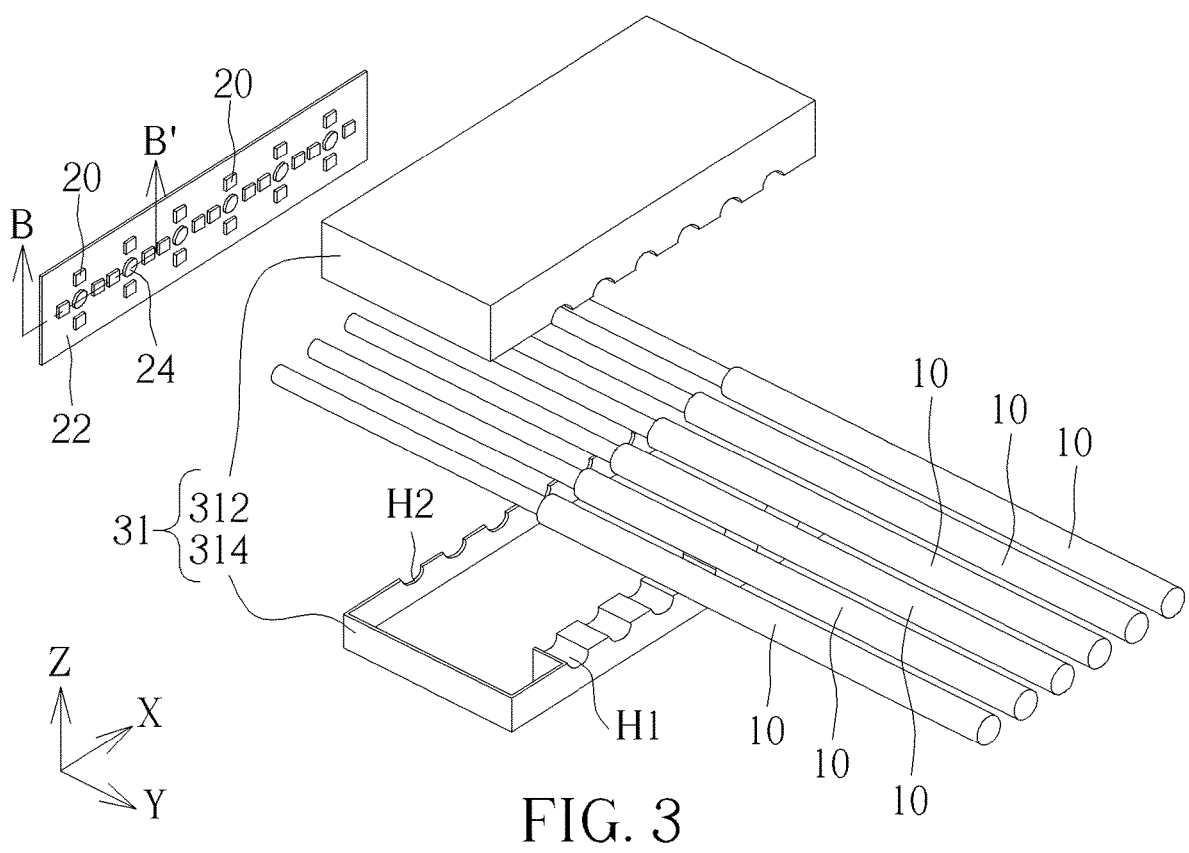
FIG. 3 is a partial perspective view of the light emitting group.

Please refer to FIG. 1, FIG. 2 and FIG. 3, which illustrate a light emitting group according to a preferred embodiment of the present invention. FIG. 1 shows an upper view of a light emitting group according to a preferred embodiment of the present invention; FIG. 2 is a sectional view taken along section line A-A' of FIG. 1; FIG. 3 is a partial perspective view of the light emitting group 100. The light emitting group 100 of the present invention includes a plurality of optical cables. For example, in this embodiment, there are six optical cables 10 parallel to each other. Each optical cable 10 includes a conductive material 11 and a light guide material 12, wherein the light guide material 12 is coated outside the conductive material 11. In this embodiment, the above-mentioned optical cables 10 have the same size, and further, the diameters of the conductive materials 11 of each optical cable also have the same size to each other, and the thicknesses of the light guide materials 12 are the same too, so each optical cable 10 has the same diameter, but the present invention is not limited thereto. In other embodiments, optical cables with different diameters can also be manufactured according to actual requirements, which is also within the scope of the present invention.

It should be noted that although a total of six optical cables 10 are shown in this embodiment, the present invention is not limited thereto. The light emitting group 100 of the present invention may include more or less optical cables, the present invention only needs two or more optical cables. In other words, two or more optical cables are required to be included in the scope of the present invention.

In this embodiment, the conductive material 11 is used as the conductive axis of the light emitting group 100 for connecting electrical signals, and the material is, for example, flexible copper wire, silver plated flexible copper wire, etc. The light guide material 12 covers the outer side of the conductive material 11 and is mainly made of transparent or semitransparent materials, such as polycarbonate resin, glass or other suitable materials. At least one conductive material 11 is electrically connected to a power source, such as a power supply in computer equipment.

In addition, except for the conductive material 11, a signal line (not shown) may be included in the light guide material 12 to transmit signals. Therefore, the light emitting group 100 of the present invention can be used as a signal transmission cord, a power cord or a combination of the two.

Please referring to FIG. 2 and FIG. 3, the present embodiment further includes a plurality of encapsulated light emitting elements 20, each encapsulated light emitting element, such as a encapsulated light emitting diode (LED), including a plurality of LEDs (light emitting units) and some conductive lines. Each optical cable 10 corresponds to at least one or more encapsulated light emitting elements 20. For example, in this embodiment, each of the optical cable 10 corresponds to four encapsulated light emitting elements 20, which are located at one end of each of the optical cable 10, and each of the four encapsulated light emitting elements 20 surrounds each of the optical cable 10, especially the conductive material 11 of each of the optical cable 10.

In this embodiment, each encapsulated light emitting element 20 is located on a printed circuit board 22, wherein the printed circuit board 22 includes a plurality of holes 24, each hole 24 is preferably arranged in parallel and corresponds to the position of the conductive material 11 of each optical cable 10, and the encapsulated light emitting element is installed around the holes 24 on the printed circuit board 22. Therefore, in the structure of this embodiment, the conductive material 11 of each optical cable 10 passes through the holes 24 to form a structure in which each light emitting element 20 is arranged surrounding the conductive material 11 of each optical cable 10. In addition, the axis direction of each optical cable 10 is parallel to the Y direction shown in FIG. 3, while the plane direction of the printed circuit board 22 is parallel to the X-Z plane shown in FIG. 3, that is, the printed circuit board 22 and the extension direction of each optical cable 10 are perpendicular to each other.

In addition, although in this embodiment, only one single printed circuit board 22 is provided and all the encapsulated light emitting elements 20 are mounted on the printed circuit board 22, but the present invention is not limited to this, and in other embodiments, a plurality of printed circuit boards 22 may be included.

It is worth noting that each encapsulated light emitting element 20 includes a plurality of light emitting units 26, each of which is, for example, a light emitting diode or a laser diode. Preferably, each encapsulated light emitting element 20 includes light emitting units capable of emitting three different colors lights, such as red light emitting diode (LED), a green light emitting diode and a blue light emitting diode, or a red laser diode, a green laser diode and a blue laser diode. The above red, green and blue light are the three primary colors of light respectively, so they can be combined into various colors light sources.

In other embodiments of the present invention, the color or number of light emitting units 26 included in each encapsulated light emitting element 20 can be adjusted. For example, in some embodiments, the encapsulated light emitting element 20 includes a monochromatic light source (e.g., one of red, blue, and green light sources or other colors light source), or a bi-color light source (e.g., two of red, blue, and green light sources, or two light sources of any different colors), or four or more light sources of different colors, all of which are within the scope of the present invention.

In this embodiment, as shown in FIG. 2, each light emitting unit 26 of the encapsulated light emitting element 20 can emit light L, and the light L irradiates on the light guiding material 12 of each optical cable 10. The light guide material 12 can transmit light (i.e., the light L emitted from the light emitting unit 26), so that the light emitting group 100 has a uniform light emitting effect. The light guide material 12 may be an electrical insulating material, and may also be used as an insulating coating material for the conductive material 11 and/or the signal line. In another embodiment, the outer portion of the conductive material 11 may be coated with an insulating material, such as polyethylene or polyvinyl chloride, and then the light guide material 12 may be coated on the outer portion of the insulating material. The insulating material is preferably a white or light color material to increase the reflection or refraction effect of light when transmitted in the light guide material 12.

In addition, the light emitting group 100 further includes a controller 30 connected to each encapsulated light emitting element 20 to control each light emitting unit 26 on the encapsulated light emitting element 20, such as turning on/off the light source, adjusting the intensity of the light, or combining the light source with a new color by turning on the light source of some colors, for example, turning on red light and blue light simultaneously to combine into purple light, etc., wherein the controller 30 can be electrically connected to the conductive material 11 of at least one optical cable 10 to electrically connect power supply to the controller 30 and each encapsulated light emitting element 20.

The controller 30 includes a housing 31. In this embodiment, the housing 31 includes an upper half portion 312 and a lower half portion 314. The upper half portion 312 and the lower half portion 314 can be locked and combined by bolts or buckles to form the housing 31. An accommodating space is formed in the housing 31 to accommodate the printed circuit board 22. In addition, two opposite sides 315 and 316 of the housing 31 form a plurality of through holes H1 and H2 through which the optical cables 10 penetrate into the housing 31 and are clamped and fixed by the upper half portion 312 and the lower half portion 314 of the housing 31.

The light emitting group 100 of the present invention further includes a connector 50, for example, a connector or a port used in computer equipment, commonly including a 6-PIN port or a 24-PIN port, etc., which is suitable for connecting hardware equipment such as a power supply, a motherboard or a display card of a computer, but is not limited thereto. The conductive materials 11 of the optical cables 10 are bonded to the connector 50. Further, the conductive materials 11 of the optical cables 10 are connected to the terminals of the connector 50. In this embodiment, both ends of the optical cables 10 are respectively connected to a connector 50.

Figure 4:
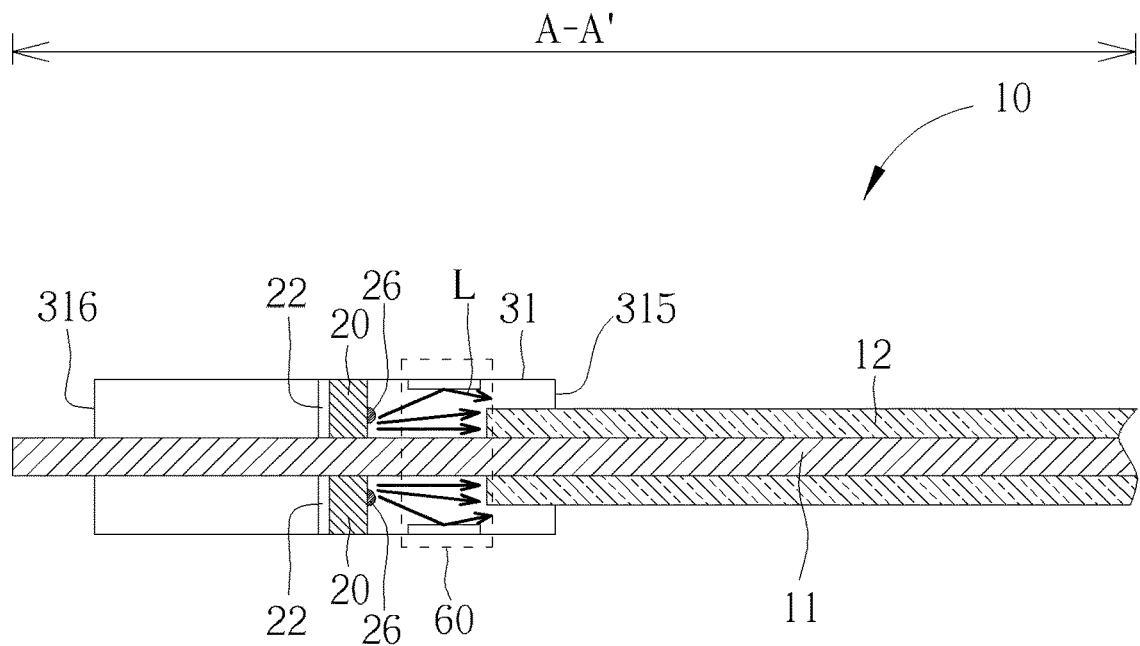
FIG. 4 is a cross-sectional view of a light emitting group according to another preferred embodiment of the present invention.
Figure 4A:
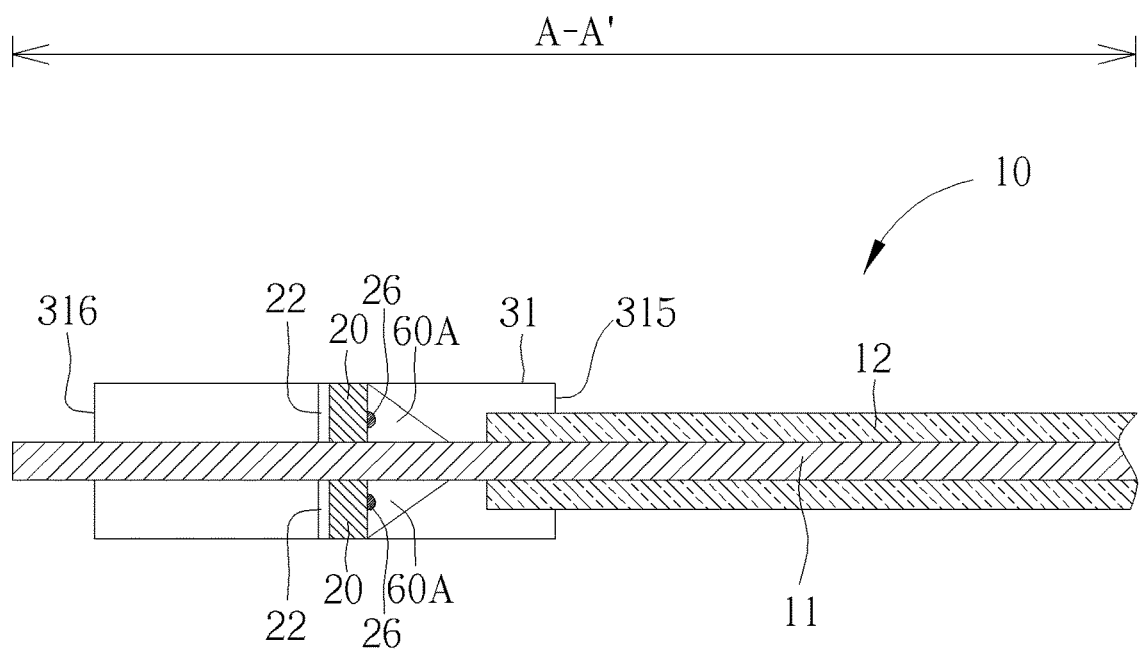
FIG. 4A is a schematic diagram showing an embodiment of a light emitting group including a secondary optical system according to the present invention.
Figure 4B:
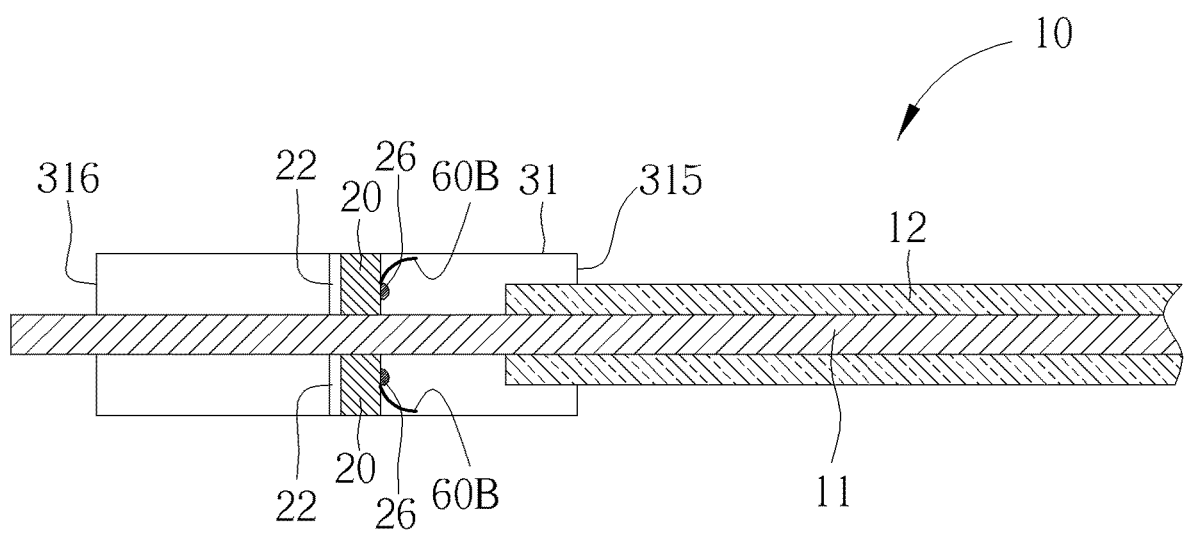
FIG. 4B is a schematic diagram showing an embodiment of a light emitting group including a secondary optical system according to the present invention.
Figure 4C:
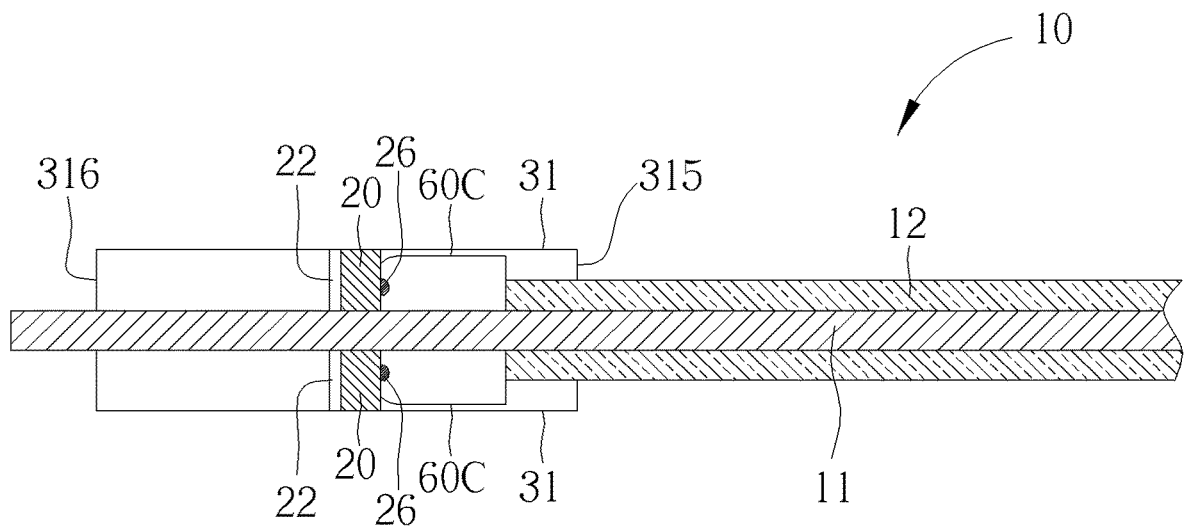
FIG. 4C is a schematic diagram showing an embodiment of a light emitting group including a secondary optical system according to the present invention.
Figure 4D:
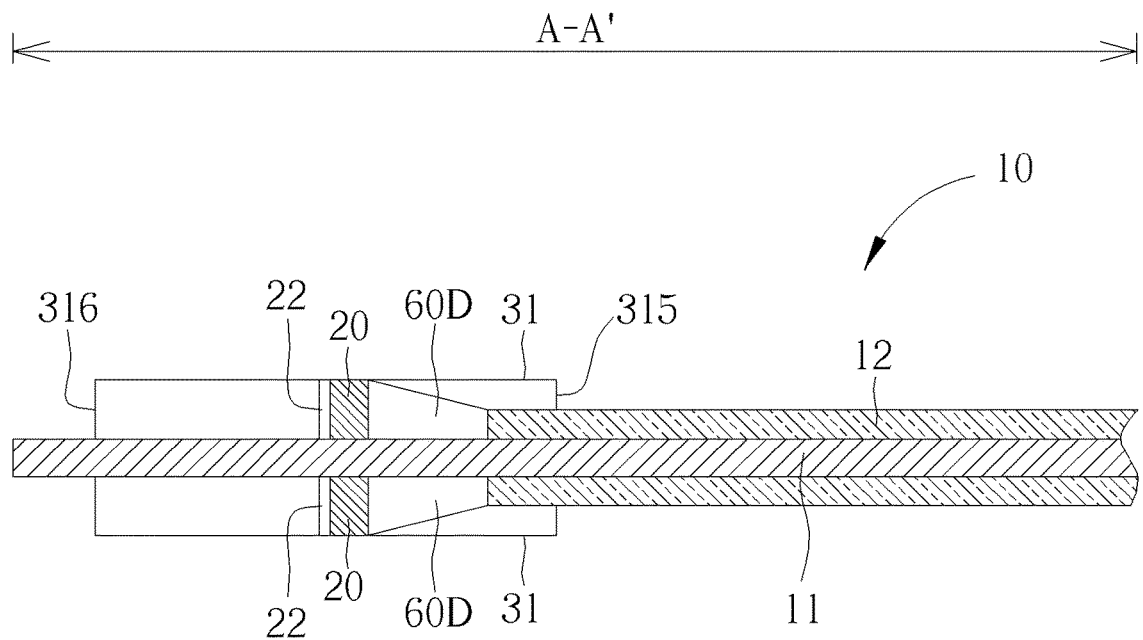
FIG. 4D is a schematic diagram showing an embodiment of a light emitting group including a secondary optical system according to the present invention.

In another embodiment of the present invention, in order to more effectively guide light into the light guide material, an additional secondary optical system may be provided between the encapsulated light emitting element and the light guide material. FIG. 4 is a cross-sectional view of a light emitting group according to another preferred embodiment of the present invention. Please refer to FIG. 4 and FIG. 2 together. In the embodiment shown in FIG. 4, a secondary optical system 60 is disposed between the encapsulated light emitting element 20 and the light guide material 12. The secondary optical system 60 may include a plurality of mirrors, a plurality of refractors, or a combination thereof. The secondary optical system 60 is provided to concentrate the light L emitted by the light emitting unit 26, increase the amount of light entering the light guide material 12, and further improve the light emitting intensity of the light emitting group and the distance between light transmission.

FIGS. 4A to 4D are schematic diagrams showing different kinds of secondary optical systems of the present invention. Please refer to the secondary optical system 60A shown in FIG. 4A. The secondary optical system 60A in this embodiment can change the light irradiating direction and introduce the light into the light guide material 12 by refraction. Please refer to the secondary optical system 60B shown in FIG. 4B. The secondary optical system 60B in this embodiment can change the light irradiating direction and introduce the light into the light guide material 12 by reflection. Please refer to the secondary optical system 60C shown in FIG. 4C. The secondary optical system 60C in this embodiment can change the light irradiating direction and introduce the light into the light guide material 12 by total reflection. Alternatively, please refer to the secondary optical system 60D shown in FIG. 4D. The secondary optical system 60D in this embodiment can change the light irradiating direction and introduce the light into the light guide material 12 by light guiding. It is worth noting that the secondary optical systems of the above embodiments can also be combined with each other, and the secondary optical systems described in this embodiment can be combined with any other embodiments described in this invention. The following paragraphs will still take the first embodiment (FIGS. 1 to 3) as an example.

Figure 5:
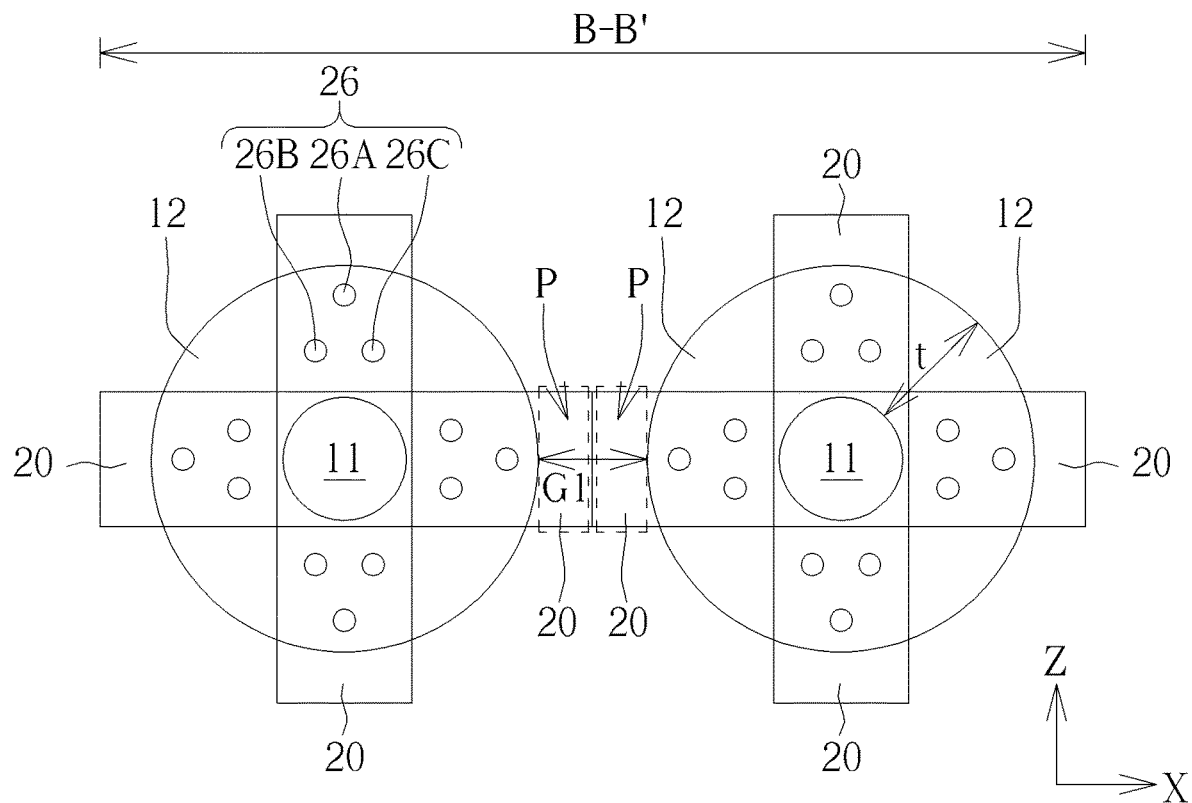
FIG. 5 shows a sectional view taken along section line B-B' of FIG. 3.

FIG. 5 shows a sectional view taken along section line B-B' of FIG. 3. In order to simplify the drawing, FIG. 5 mainly depicts the arrangement positions of part of the optical cables 10 and part of the encapsulated light emitting elements 20, while the remaining elements will be omitted from the drawing. In this embodiment, each package light emitting element 20 surrounds the periphery of the optical cables 10 when viewed from a cross-sectional direction (that is, from the XZ plane direction in FIG. 3). In the present invention, in order to improve the luminous intensity and luminous length of the light emitting group 100, the number of encapsulated light emitting elements 20 disposed around each optical cable 10 can be increased. In other words, when more encapsulated light emitting elements 20 are arranged around each optical cable 10, a stronger light source can be irradiated into the light guide material 12 of the optical cable 10, thereby increasing the light efficiency intensity displayed by the light emitting wire 100 and also increasing the light transmission distance. In this embodiment, four encapsulated light emitting elements 20 are arranged around each optical cable 10, but not limited thereto, and the number of encapsulated light emitting elements corresponding to each optical cable can be adjusted according to actual requirements.

As shown in FIG. 5, in this embodiment, each encapsulated light emitting element 20 is arranged in four orientations of the conductive material 11 of the optical cable 10, for example, along the x-axis and z-axis, the encapsulated light emitting element 20 is disposed at the right, up, left and down of the conductive material 11 of the optical cable 10. It is worth noting that from the cross-sectional view (FIG. 5), each encapsulated light emitting element 20 does not contact the conductive material 11, so as not to affect the signal transmission of the conductive material 11. In addition, the larger the size of the encapsulated light emitting element 20, the better the heat dissipation effect and the brighter the light emission luminance. Therefore, in the present invention, considering brightness, the encapsulated light emitting element 20 with a larger size is selected. The encapsulated light emitting element 20 currently used by the applicant is relatively large in size and comprises light emitting units (such as LED) of three different colors, as well as conductive lines or solder bump thereof. In the present invention, the length of either side of the used encapsulated light emitting element 20 is greater than a thickness T of the light guide material 12 of the optical cable 10. Therefore, after the encapsulated light emitting element 20 is mounted around the conductive material 11, a part of the area of the encapsulated light emitting element 20 will protrude out of the outer diameter of the light guide material 12 (defined as the protrusion p in FIG. 5), resulting in a part of the area of each encapsulated light emitting element 20 not overlapping the area of the light guide material 12. Taking this embodiment as an example, the minimum boundary dimension of the encapsulated light emitting element 20 is about 1.5 mm, and the thickness t of the light guide material 12 is about 1.2 mm, but is not limited thereto.

In addition, the encapsulated light emitting element 20 includes a plurality of light emitting units 26. In the present invention, in order to improve the intensity of light conduction to the light guide material 12, it is preferable to align the positions of the light emitting units 26 with the positions of the light guide material 12. In other words, the light emitting unit 26 will be located in the area covered by the light guide material 12 as viewed from the sectional view. As shown in FIG. 5, each encapsulated light emitting element 20 includes, for example, a red light emitting unit 26A, a green light emitting unit 26B, and a blue light emitting unit 26C. The positions of the red light emitting unit 26A, the green light emitting unit 26B, and the blue light emitting unit 26C overlap with the area covered by the light guide material 12. In addition, since the positions of the light emitting units are within the range of the light guide material 12, it is also possible to prevent the light emitted interfering by the light emitting units from other adjacent optical cables.

Applicants have found that when the number of encapsulated light emitting elements arranged around the optical cable increases, more space is also needed to accommodate the optical cable and the encapsulated light emitting elements, which will lead to an increase in the volume of the hardware equipment and is not conducive to the miniaturization of the elements. Especially when these hardware devices are applied to, for example, e-sport laptop, it is more necessary to reduce the volume of hardware devices as much as possible to meet the market demand.

In FIG. 5 mentioned above, the distance between the optical cables 10 cannot be further reduced due to the arrangement of the encapsulated light emitting elements 20. More specifically, since each encapsulated light emitting element 20 has a portion of its area protruding beyond the range of the light guide material 12 (protrusion p in FIG. 5), according to the arrangement of encapsulated light emitting elements shown in FIG. 5, even if two adjacent encapsulated light emitting elements 20 are already in close proximity, the distance between each optical cables 10 is still difficult to further reduce, and a boundary is left between the two optical cables 10, and the width of this boundary is defined as G1. In addition, although the above-mentioned problems may be solved by reducing the size of the encapsulated light emitting element or increasing the thickness of the light guide material, this will greatly increase the process difficulty or manufacturing cost.

Figure 6:
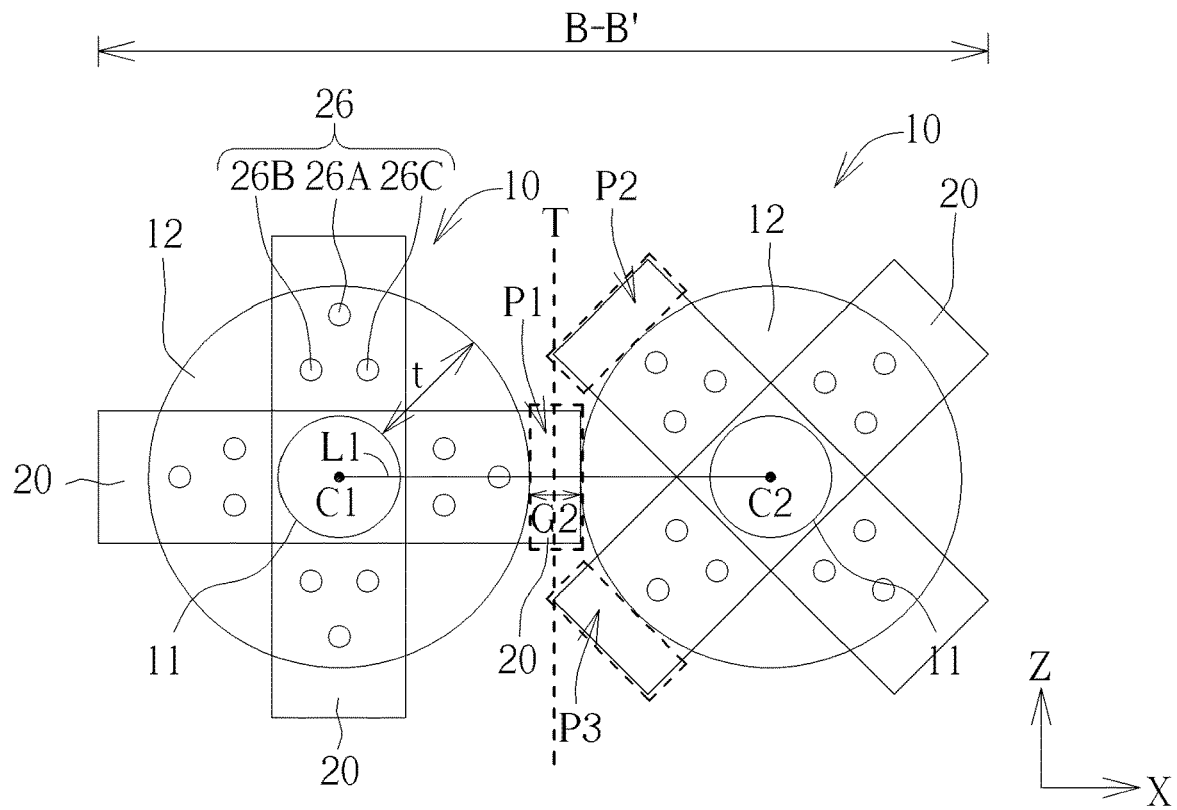
FIG. 6 shows an arrangement of encapsulated light emitting elements according to another preferred embodiment of the present invention.

Therefore, the present invention provides another embodiment. Please refer to FIG. 6, there is no need to reduce the size of each element or increase the thickness of the light guide material. Only changing the arrangement mode of the encapsulated light emitting elements can make the arrangement between the optical cables closer, thus saving space. As shown in FIG. 6, in this embodiment, four encapsulated light emitting elements 20 are also included around each optical cable 10. However, the encapsulated light emitting elements 20 are arranged in a staggered manner at an interface of the optical cables (the interface is defined as the space closest to each other between the optical cables 10, that is, the position where the width G2 is located). Taking this embodiment as an example, for the left optical cable 10, the encapsulated light emitting element 20 is still respectively arranged on the right, up, left and down of the conductive material 11 (e.g., 0 degree, 90 degrees, 180 degrees and 270 degrees respectively along the X-Z axis), while for the right optical cable 10, the encapsulated light emitting element 20 is respectively arranged on the right oblique upper, left oblique upper, left oblique lower and right oblique lower of the conductive material 11 (e.g., 45 degrees, 135 degrees, 225 degrees and 315 degrees respectively along the X-Z axis). It is worth noting that the above-mentioned angle is only an example of the present invention, and it is also within the scope of the present invention if the arrangement angle is adjusted.

According to the arrangement mode of this embodiment, the centers of the two optical cables 10 are defined as the center C1 and the center C2 respectively, the connecting line (virtual connecting line) connecting the two centers C1 and C2 is defined as L1, and the perpendicular bisector T of the connecting line L1 is defined on the figure. The perpendicular bisector T is perpendicular to the connecting line L1, and the distances from any position on the perpendicular bisector T to the center C1 and to the center C2 are equal. In this embodiment, at least one encapsulated light emitting element 20 overlaps with the perpendicular bisector T. Taking FIG. 6 as an example, there are three encapsulated light emitting elements 20 overlapping the perpendicular bisector T. In this embodiment, the encapsulated light emitting elements 20 on the two optical cables 10 are arranged in a staggered manner along the perpendicular bisector T. On the other hand, the encapsulated light emitting elements 20 contained in the two optical cables 10 are not symmetrically arranged along the perpendicular bisector T. According to the invention, the arrangement of the encapsulated light emitting elements 20 is changed, so that the encapsulated light emitting elements 20 are in staggered arrangement at the interface, and a protrusion P1 of the left optical cable 10 is positioned between a protrusion P2 and another protrusion P3 of the right optical cable 10, so that the space between the protrusions is effectively utilized, and the distance between the two optical cables 10 is closer, that is, the gap width G2 is smaller than the gap width G1 of the above embodiment, thereby achieving the effects of saving module space, increasing the number of encapsulated light emitting elements in a limited space, increasing the luminous intensity, and the like.

The following description will detail the different embodiments of the arrangement of the encapsulated light emitting elements of the present invention. To simplify the description, the following description will detail the dissimilarities among the different embodiments and the identical features will not be redundantly described. In order to compare the differences between the embodiments easily, the identical components in each of the following embodiments are marked with identical symbols.

Figure 7:
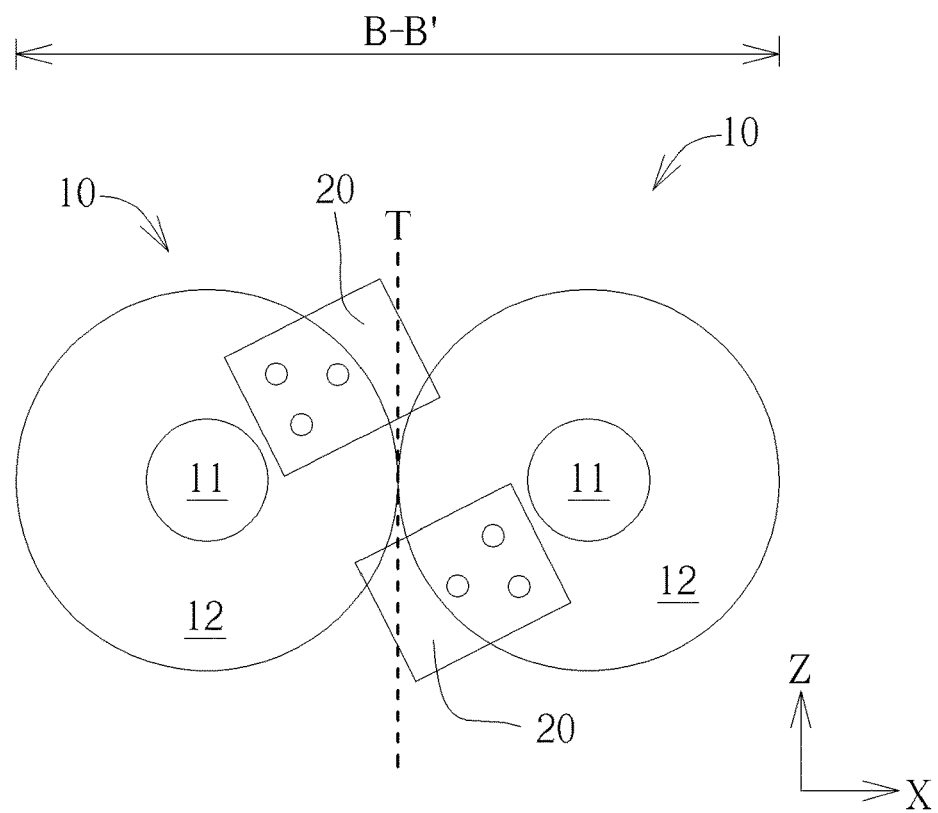
FIG. 7 shows an arrangement of encapsulated light emitting elements according to another preferred embodiment of the present invention.

Please refer to FIG. 7, which shows the arrangement of encapsulated light emitting elements in another preferred embodiment of the present invention. In order to simplify the description, this embodiment will be described with two adjacent optical cables, however, it is understood that the present invention is not limited to this, and may include more optical cables. As shown in FIG. 7, only one encapsulated light-emitting element 20 is arranged around each optical cable 10, and the left encapsulated light-emitting element 20 and the right encapsulated light-emitting element 20 are arranged at different arrangement positions or at different arrangement angles and form a staggered arrangement. In this embodiment, the two optical cables 10 may be in direct contact to each other, that is, the spacing between the two guide cable wires is 0, but is not limited thereto, and the two optical cables 10 may be separated by a distance. In addition, in this embodiment, at least one encapsulated light-emitting element 20 overlaps with partial areas of the two adjacent optical cables 10 simultaneously, and this embodiment also satisfies the condition that at least one encapsulated light-emitting element 20 overlaps with the perpendicular bisector T (in this embodiment, two encapsulated light-emitting elements 20 overlap with the perpendicular bisector T). In addition, it should be noted that in some embodiments, if the two guide cables 10 are in direct contact to each other, the perpendicular bisector T is equal to an internal tangent of the two optical cables 10.

Figure 8:
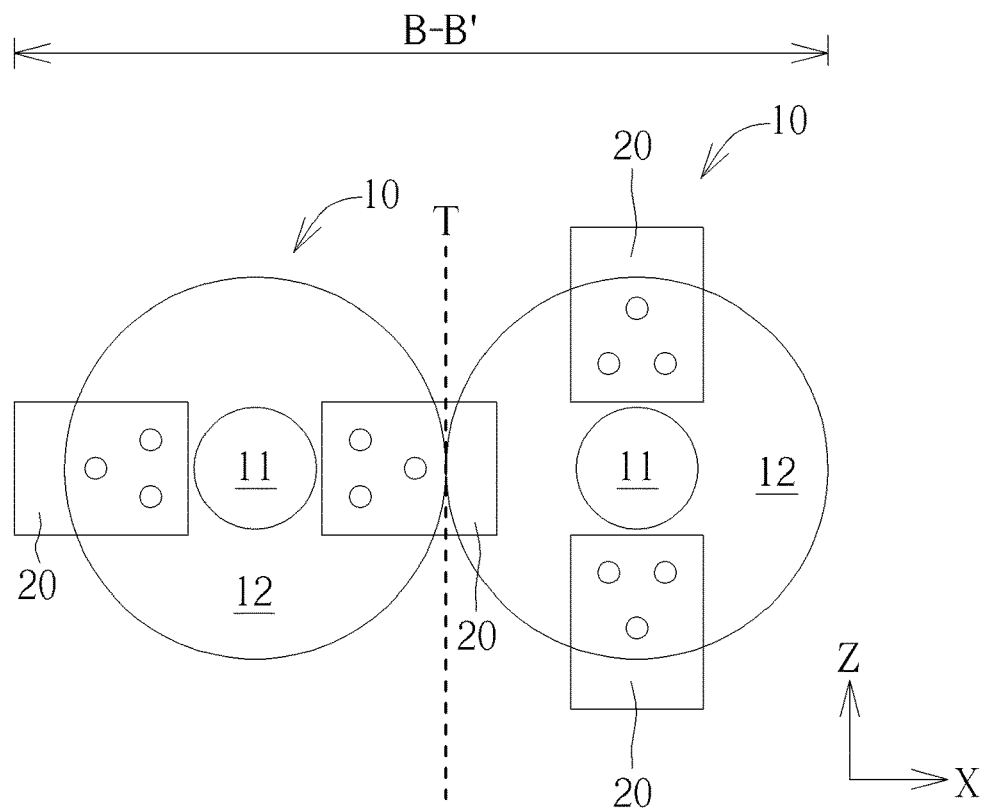
FIG. 8 shows an arrangement of encapsulated light emitting elements according to another preferred embodiment of the present invention.

Please refer to FIG. 8, which shows the arrangement of encapsulated light emitting elements in another preferred embodiment of the present invention. In order to simplify the description, this embodiment will be described with two adjacent optical cables, however, it is understood that the present invention is not limited to this, and may include more optical cables. As shown in FIG. 8, two encapsulated light emitting elements 20 are arranged around each optical cable 10, and the left two encapsulated light emitting elements 20 and the right two encapsulated light emitting elements 20 are arranged at different arrangement positions or arrangement angles, for example, the left two encapsulated light emitting elements 20 are arranged along the vertical direction (z axis), while the right two encapsulated light emitting elements 20 are arranged along the horizontal direction (x axis) and form a staggered arrangement. In this embodiment, the two optical cables 10 may be in direct contact to each other, that is, the spacing between the two guide cable wires is 0, but is not limited thereto, and the two optical cables 10 may be separated by a distance. In addition, in this embodiment, at least one encapsulated light emitting element 20 overlaps with partial areas of the two adjacent optical cables 10 simultaneously, and this embodiment also satisfies the condition that at least one encapsulated light emitting element 20 overlaps with the perpendicular bisector T (in this embodiment, one encapsulated light emitting element 20 overlaps with the perpendicular bisector T).

Figure 9:
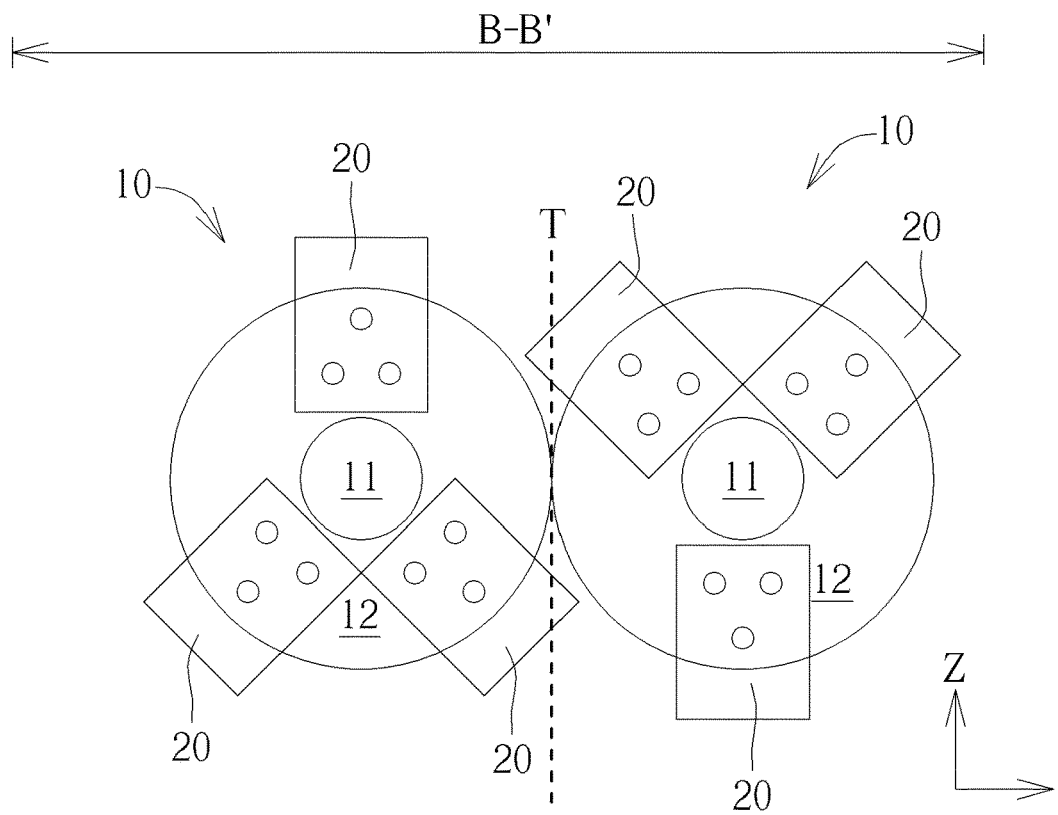
FIG. 9 shows an arrangement of encapsulated light emitting elements according to another preferred embodiment of the present invention.

Please refer to FIG. 9, which shows the arrangement of encapsulated light emitting elements in another preferred embodiment of the present invention. In order to simplify the description, this embodiment will be described with two adjacent optical cables, however, it is understood that the present invention is not limited to this, and may include more optical cables. As shown in FIG. 9, three encapsulated light emitting elements 20 are arranged around each optical cable 10, and the left encapsulated light emitting elements 20 and the right encapsulated light emitting elements 20 are arranged at different positions or at different arrangement angles. For example, the left three encapsulated light emitting elements 20 are arranged in a regular triangle, while the three right encapsulated light emitting elements 20 are arranged in an inverted triangle and form a staggered arrangement. In this embodiment, the two optical cables 10 may be in direct contact to each other, that is, the spacing between the two optical cables is 0, but is not limited thereto, and the two optical cables 10 may be separated by a distance. In addition, this embodiment also satisfies the condition that at least one encapsulated light emitting element 20 overlaps with the perpendicular bisector T (in this embodiment, two encapsulated light emitting elements 20 overlap with the perpendicular bisector T).

Figure 10:
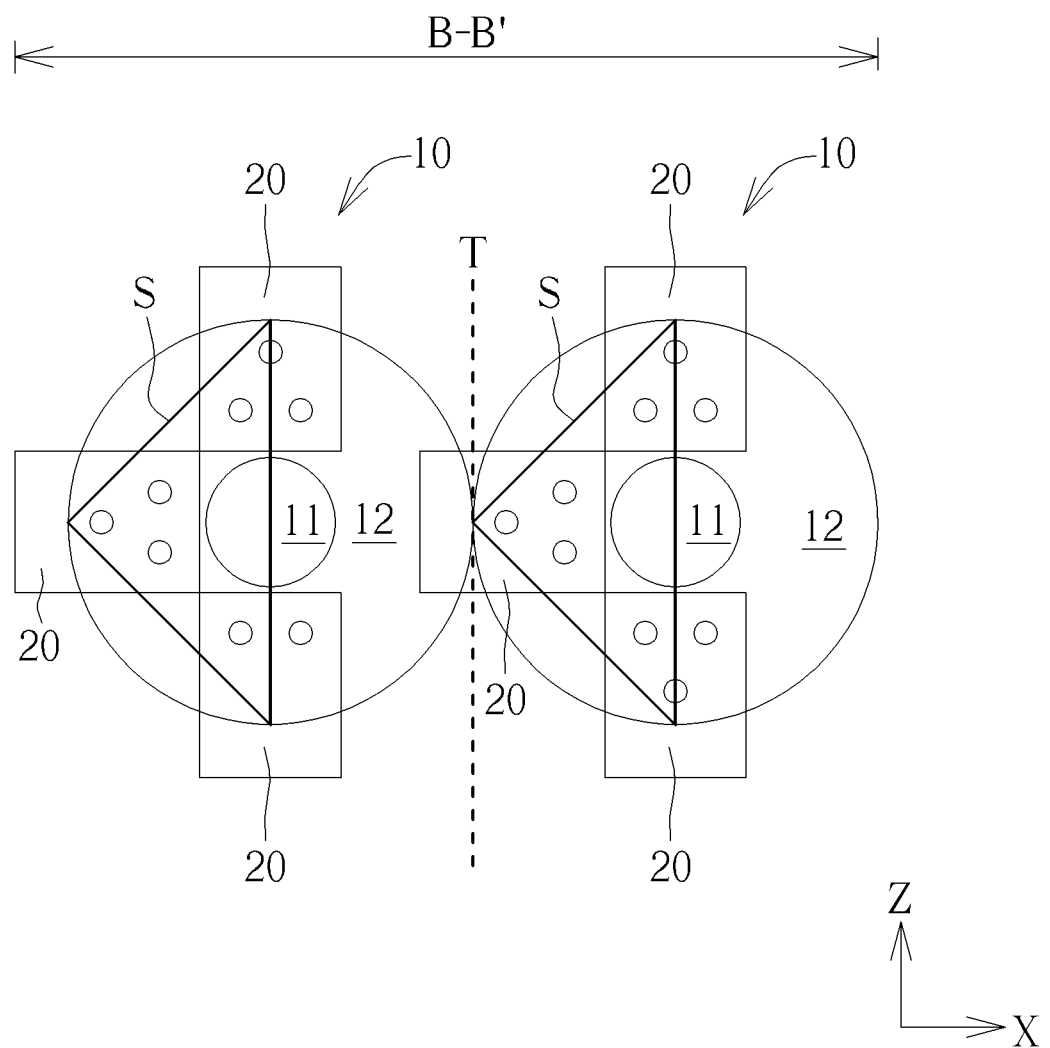
FIG. 10 shows an arrangement of encapsulated light emitting elements according to another preferred embodiment of the present invention.

Please refer to FIG. 10, which shows an arrangement of encapsulated light emitting elements in another preferred embodiment of the present invention. In order to simplify the description, this embodiment will be described with two adjacent optical cables, however, it is understood that the present invention is not limited to this, and may include more optical cables. As shown in FIG. 10, three encapsulated light emitting elements 20 are disposed around each of the optical cables 10. In this embodiment, the left encapsulated light emitting element 20 and the right encapsulated light emitting element 20 are arranged at the same arrangement position or at the same angle. Although the above-mentioned "staggered arrangement" is not formed in this embodiment, it is worth noting that the plurality of encapsulated light emitting elements 20 included in each optical cable are arranged into a pattern S in a cross-sectional direction, wherein the pattern S is an asymmetrical shape. For example, as shown in FIG. 10, each pattern s is an asymmetrical pattern along a vertical direction (i.e., a direction parallel to the perpendicular bisector T). In this embodiment, each pattern S is an asymmetrical triangular pattern, such as an isosceles triangle with a vertex on the left. That is to say, in this embodiment, the patterns S of each optical cable are on the same side (i.e., isosceles triangles with vertices on the left), so that the arrangement of the patterns is more compact and helps to increase the light input (because more encapsulated light emitting elements can be accommodated in the limited area). In this embodiment, the two optical cables 10 may be in direct contact to each other, that is, the spacing between the two optical cables is 0, but is not limited thereto, and the two optical cables 10 may be separated by a distance. In addition, in this embodiment, at least one encapsulated light emitting element 20 overlaps with partial area of the two adjacent optical cables 10 simultaneously, and this embodiment also satisfies the condition that at least one encapsulated light emitting element 20 overlaps with the perpendicular bisector T (in this embodiment, one encapsulated light emitting element 20 overlaps with the perpendicular bisector T).

It is worth noting that although in the above embodiments, the encapsulated light emitting elements are mostly distributed in an average arrangement to achieve the effect of uniform light transmission, the present invention does not limit that the encapsulated light emitting elements must be distributed in an average arrangement, and the arrangement of the encapsulated light emitting elements can be adjusted according to actual requirements.

To sum up, if the arrangement of encapsulated light emitting elements meets one or more of the following conditions, it should belong to the arrangement of the present invention:

(1) For two adjacent optical cables, there is at least one encapsulated light emitting element, which overlaps with a perpendicular bisector of the connecting line of the two adjacent optical cables.

(2) For two adjacent optical cables, the arrangement positions or arrangement angles of the encapsulated light emitting elements arranged on the periphery are different.

(3) A plurality of encapsulated light emitting elements included in each optical cable are arranged in the same patterns, wherein each pattern is an asymmetric pattern (along the vertical direction or along the perpendicular bisector direction).

In addition, in other embodiments of the present invention, instead of forming a large-volume encapsulated light emitting element, the internal light emitting units (e.g., LED) may be directly formed on the printed circuit board and then encapsulated by the housing, thereby achieving the effects of waterproof and dustproof. In this way, more light emitting elements can be accommodated in a limited space.

The invention is characterized in that when more encapsulated light emitting elements are arranged around each optical cable, a stronger light source can be irradiated into the light guide material of the optical cable, so that the display light efficiency intensity of the optical cable is increased, and the light conduction distance can also be increased. However, when the number of encapsulated light emitting elements arranged around the optical cables increases, more space is also needed to accommodate the optical cables and the encapsulated light emitting elements. Therefore, in the present invention, the arrangement mode of the encapsulated light emitting elements is changed, the size of each element does not need to be reduced, and the thickness of the light guide material does not need to be increased either, so that the optical cables can be arranged more tightly, thereby saving space.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light emitting group comprising:
   at least two optical cables are adjacent to each other, wherein each optical cable respectively comprises a conductive material and a light guide material, wherein the light guide material covers the conductive material; and
   a plurality of encapsulated light emitting elements, wherein each optical cable corresponds to at least one encapsulated light emitting element of the plurality of encapsulated light emitting elements, and the encapsulated light emitting elements are positioned at a terminal of each optical cable, wherein a minimum side of the encapsulated light emitting element is longer than a thickness of the light guide material, and a connecting line is connected with two centers of the two optical cables from a cross-sectional direction, and at least one encapsulated light emitting element of the plurality of encapsulated light emitting elements overlaps with a perpendicular bisector in the connecting line.

2. The light emitting group of claim 1, wherein the perpendicular bisector is perpendicular to the connecting line, and the distance from any position on the perpendicular bisector to the center of each of the two optical cables is equal.

3. The light emitting group of claim 1, wherein each of the encapsulated light emitting elements is located in a housing.

4. The light emitting group of claim 1, wherein each encapsulated light emitting element is located on a printed circuit board, and the conductive materials of the two optical cables pass through the printed circuit board, wherein an axial direction of the conductive material of the optical cables is perpendicular to a surface of the printed circuit board.

5. The light emitting group of claim 1, wherein the arrangement positions of the encapsulated light emitting elements corresponding to each of the two optical cables are different.

6. The light emitting group of claim 1, wherein each encapsulated light emitting element comprises a plurality of light emitting units, and each light emitting unit overlaps with an area of the light guide material as viewed from the cross-sectional direction.

7. The light emitting group of claim 6, wherein the light emitting unit on each of the encapsulated light emitting elements comprises a red light emitting diode, a green light emitting diode and a blue light emitting diode.

8. The light emitting group of claim 6, further comprising a controller electrically connected to the encapsulated light emitting elements and controlling the light emitting units on the encapsulated light emitting elements to emit the light.

9. The light emitting group of claim 1, wherein a portion of the area of the encapsulated light emitting element does not overlap with the light guide material but protrudes from an outer diameter of the light guide material as viewed from the cross-sectional direction.

10. The light emitting group of claim 1, wherein the two optical cables are in direct contact to each other.

11. The light emitting group of claim 1, wherein the size and area of each encapsulated light emitting element are the same as each other, and the thickness of each light guide material is also the same as each other.

12. The light emitting group of claim 1, wherein at least one package light emitting element overlaps with partial area of the two optical cables simultaneously.

13. The light emitting group of claim 1, further comprising a plurality of secondary optical system elements positioned between each of the encapsulated light emitting elements and the light guide material of the optical cable.

14. The light emitting group of claim 13, wherein each secondary optical system comprises at least one reflecting mirror, at least one refracting mirror or a combination thereof.

15. The light emitting group of claim 1, wherein along the direction of the perpendicular bisector, the encapsulated light emitting elements on the two optical cables are arranged in a staggered manner with each other.

16. The light emitting group of claim 15, wherein the encapsulated light emitting elements contained in the two optical cables are not symmetrically arranged along the direction of the perpendicular bisector.

17. The light emitting group of claim 1, wherein the plurality of encapsulated light emitting elements are arranged into a pattern, and wherein the pattern is in an asymmetrical shape.

18. The light emitting group of claim 17, wherein the patterns contained in each of the optical cables are the same to each other.

* * * * *